Sept. 14, 1965      M. J. DI TORO      3,206,687
APPARATUS FOR MINIMIZING DISTORTION IN
WAVE-SIGNAL TRANSLATING CHANNELS
Filed March 19, 1962      5 Sheets-Sheet 1

United States Patent Office 3,206,687
Patented Sept. 14, 1965

3,206,687
APPARATUS FOR MINIMIZING DISTORTION IN WAVE-SIGNAL TRANSLATING CHANNELS
Michael J. Di Toro, Massapequa, N.Y., assignor to Cardion Electronics, Inc., a corporation of Delaware
Filed Mar. 19, 1962, Ser. No. 180,456
11 Claims. (Cl. 328—163)

This invention relates to apparatus for minimizing distortion in wave-signal translating channels and, while it is of general application, it is particularly suitable for minimizing distortion in voice and ultrasonic-frequency and data transmission channels and will be described specifically in such an embodiment.

It is well known that most conventional wave-signal translating channels have a nonlinear phase shift-frequency or time delay-frequency translation characteristic which gives rise to waveform distortion or dispersion of electrical pulses or signals used in data transmission. For example, in the case of data transmission, it has been established that a translating system having a moderate signal-to-noise ratio and a linear phase-frequency characteristic to a cutoff frequency $f_c$ can translate, without intersymbol interference, pulses of various amplitudes at the rate of $2f_c$ pulses per second. Most current data transmission systems achieve only a fraction of the foregoing pulse rate because their nonlinear phase shift-frequency characteristic causes dispersion or lengthening in time of each pulse transmitted, much beyond the theoretical value of $\frac{1}{2}f_c$. It has been shown that this dispersion is caused not only by the nonlinear phase shift-frequency characteristic of the channel but also by a large slope of its amplitude-frequency response characteristic.

In applications in which the phase shift-frequency characteristic of the signal-translating channel is time-invariant, the distortion or dispersion of the translated signal can be corrected without too much difficulty by the use of phase modulation schemes or by compensating or equalizing networks having complementary frequency-response characteristics. However, in many signal-translating channels, such characteristic varies with time in a random manner. For example, in conventional voice telephone circuits having the usual low-frequency and high-frequency group delay distortion, the characteristics will vary considerably when two subscribers are connected by different channels from call to call. Other examples of such random time-variable transmission characteristics are high-frequency radio transmission links via the dispersive and multipath earth-ionosphere duct, underwater acoustic information transmission systems, moon or satellite reflecting relay systems, etc.

It is not practicable to implement for automatic operation the previously proposed schemes for delay equalization, especially those employing frequency synthesis. With the increasing use of signal-translating channels having such randomly varying characteristics as data transmission links, means for increasing the speed of data transmission is urgently sought.

It is an object of the invention, therefore, to provide a new and improved apparatus for minimizing waveform distortion and dispersion in a wave-signal translating channel having a time-variable phase shift-frequency characteristic.

It is another object of the invention to provide a new and improved apparatus for minimizing distortion in wave-signal translating channels in which the effective phase shift characteristic is varied automatically with time to compensate for random time variations in such characteristic of the channel.

In accordance with the invention, there is provided in a wave-signal translating channel, an apparatus for minimizing distortion of a translated signal arising from nonlinear phase characteristics of the channel comprising an input circuit for supplying a signal to be translated; an output circuit; a wave-signal transmission line coupled to the input circuit, having a predetermined time delay, and provided with a plurality of electrically spaced connection taps; and means for sensing the polarity and magnitude of the instantaneous signal voltage at each of the line taps in response to the distribution of an electrical test signal along the line. The apparatus further comprises means for coupling the signal outputs of all of the line taps indicating one polarity directly to the output circuit and for coupling the signal outputs of the remaining of the line taps to the output circuit with polarities reversed with respect to their polarities at their respective taps, and means responsive to the signal-sensing means for enabling the coupling means only with respect to those taps at which the test-signal voltage exceeds a predetermined value.

Further in accordance with the invention, there is provided in a wave-signal translating channel, an apparatus for minimizing distortion of a translated signal arising from nonlinear phase characteristics of the channel comprising an input circuit for supplying a pair of successive test signals; an output circuit; a wave-signal transmission line coupled to the input circuit, having a predetermined time delay, and provided with a plurality of electrically spaced connection taps; and means for sensing the instantaneous signal voltage at each of the line taps in response to the distribution of an electrical test signal along the line. The apparatus further comprises linear means for simultaneously coupling the signal outputs of all of the line taps indicating one polarity directly to the output circuit and for coupling the signal outputs of the remaining of the line taps to the output circuit with polarities reversed with respect to their polarities at their respective taps, and correlation means coupled to the signal-sensing means for enabling the coupling means only upon the occurrence of predetermined correlated test-signal components in successive test input signals.

For a better understanding of the present invention, together with other and further objects thereof, reference is had to the following description taken in connection with the accompanying drawings, while its scope will be pointed out in the appended claims.

Referring now to the drawings.

Figure 1:
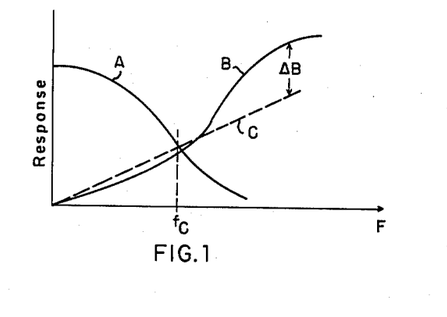
FIG. 1 represents certain translating characteristics of a signal-translating channel.

Before describing the particular apparatus embodying the present invention, it is believed that it would be helpful to consider certain fundamental principles. FIG. 1 illustrates certain pertinent characteristics of a typical dispersive and/or multipath signal-translating channel. In this figure, curve A represents the amplitude-frequency response of the channel, the abscissa $f_c$ representing the amplitude cutoff frequency of the channel. In this same figure, curve B represents the nonlinear phase shift-frequency characteristic of the channel, while dash-line curve C illustrates the ideal linear phase shift-frequency characteristic. The parameter $\Delta B$ represents the phase distortion of the network at a particular frequency and is the difference between curve B and curve C. FIG. 1 represents either the characteristic of such a channel whose characteristics are time-invariant or, if time-variable, represents such characteristics at a particular instant, the forms of curves A and B varying with time, usually in a random manner. For example, single-side band carrier voice systems may show a frequency shift or resultant flutter of as much as 2 c.p.s. in the restored voice spectrum while, in high-frequency earth-ionospheric duct transmission, multipath reception on a given carrier has been found to be uncorrelated after only a fraction of a second to a few seconds of transmission.

Figure 2:
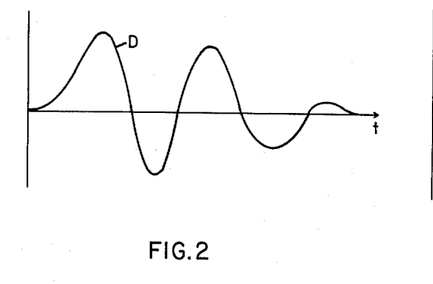
FIG. 2 represents a typical response $h(t)$ of a channel having the characteristics of FIG. 1 to an ideal input impulse for the purpose of explanation.
Figure 3:
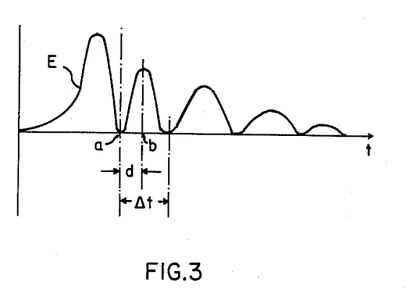
FIG. 3 represents the square of the function $h(t)$ of FIG. 2.

FIG. 2 represents a typical dispersed response of a channel having the characteristics of FIG. 1 to an ideal input impulse, this response generally being referred to as the function $h(t)$. In many information transmission systems, it is desirable to avoid intersymbol interference arising from dispersion between contiguously transmitted pulses. It accordingly becomes necessary to define dispersion of the received distorted pulse. Referring to FIG. 3, curve E represents the square of curve D of FIG. 2. In this figure, the dispersion $\Delta t$ is indicated. This factor $\Delta t$ has been defined as $2\sqrt{\pi}$ times the radius of gyration of $[h(t)]^2$ about its center of gravity, the radius of gyration being the distance $d$ from the center gravity $a$ of $h^2(t)$ to the effective center $b$ of the mass of the rotating area. It can be shown that:

$$(\Delta t)^2 = 4\pi \frac{\int_0^\infty \left[ A^2 \left( \frac{d\Delta B}{d\omega} \right)^2 + \left( \frac{dA}{d\omega} \right)^2 \right] d\omega}{\int_0^\infty A^2 d\omega} \quad (1)$$

This shows that dispersion aries from nonzero magnitudes of $\Delta B$ or $(d\Delta B/d\omega)$ and of $(dA/d\omega)$.

For an ideal correction of the phase distortion $\Delta B$ of such a transmission channel, it would be necessary to provide an ideal compensating network having an impulse response of $h(T-t)$, where T is some fixed time-delay constant. Such a network would have a distortion $-\Delta B$ equal and opposite to that of the channel and, accordingly, by Equation 1, would result in a decreased over-all dispersion.

The present invention is based on the discovery that a quite satisfactory approximation of the ideal phase compensation can be achieved by providing a compensating network having an impulse response which, for signals above a predetermined instantaneous magnitude, is automatically adjustable in accordance with the function sgn $h(T-t)$, that is, a function of constant amplitude which reverses polarity coincidently with the reversal of polarity of the function $h(T-t)$.

Figure 4:
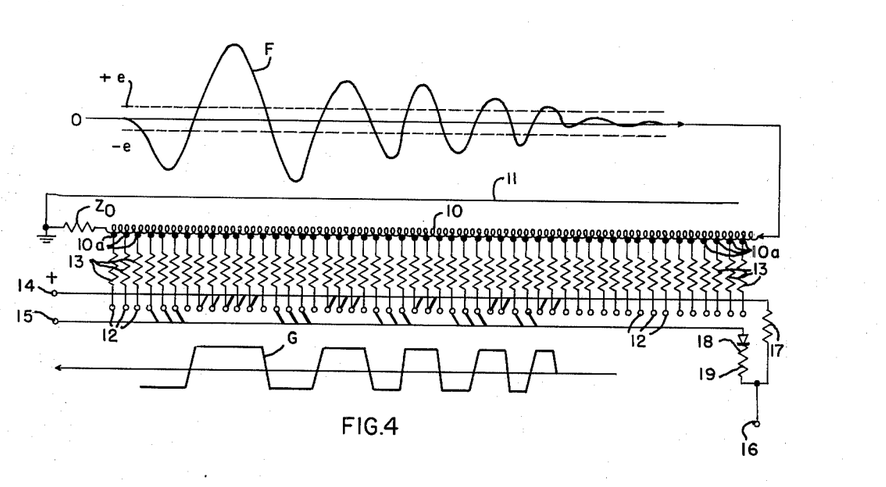
FIG. 4 is a simplified circuit diagram illustrating the functional concept of the present invention.

A functional concept of the basis of the present invention is shown in FIG. 4. Assume that the received impulse response $h(t)$ of the channel, shown as curve F in FIG. 4, is applied to a conventional unbalanced transmission line 10 having a neutral or ground line 11 and terminated in its characteristic impedance $Z_0$. Assume that line 10 is provided with a plurality of electrically spaced connection taps 10a, 10a, etc. (usually uniformly spaced), and consider the instant when a dispersed impulse, represented by curve F, is applied to the line and lies wholly distributed along the line 10 with a spatial potential distribution which may also be represented by curve F. Curve F is of the same general character as curve D of FIG. 2 but represents the dispersion of an input impulse by a line having characteristics somewhat different from those represented in FIG. 1. To avoid false tap connections arising from suprious noise, it is desired to disregard those portions of curve F having values less than some predetermined positive value $e$ and those having values less than some predetermined negative value $-e$, this range corresponding to the expected range of noise signals.

Connection taps 10a, 10a, etc., are individually connected to a series of switches 12, 12, etc., through isolating resistors 13, 13, etc. Each of the switches 12 is operable to engage a "plus" bus 14, a "minus" bus 15, or no connection, the bus 14 being connected directly to output terminal 16 through a current-adding resistor 17 while the negative bus 15 is connected to the output terminal 16 through a polarity-reversing amplifier 18 and a current-adding resistor 19.

If then the several switches 12 are operated so that each of the connection taps 10a at which there appears a positive potential exceeding the value $+e$ is connected to the positive bus 14 and each of the taps at which there appears a negative potential exceeding the value $-e$ is connected to the negative bus 15, as illustrated, while each of the switches 12 connected to the taps at which there appears a potential lying within the range $+e$ to $-e$ is left disconnected from both buses, then, under these conditions, the response at the output 16 of the delay line with the foregoing tap connections made by switches 12 is shown by curve G of FIG. 4. Curve G is representative of the function sgn $h(T-t)$ and, it will be noted, has zero-axis intercepts corresponding to those of curve F as closely as can be approximated by the taps 10a. When a signal represented by curve F is applied to the input of the delay line 10, there will result an instant in time when the summation of the positive signal lobes of curve F supplied to bus 14, plus the summation of the negative signal lobes of curve F supplied to bus 15, reversed in polarity, will be added by the circuit 17, 18, 19 and appear at the output terminal 16 as a desirably large and sharply peaked signal largely devoid of dispersion.

Figure 5A:
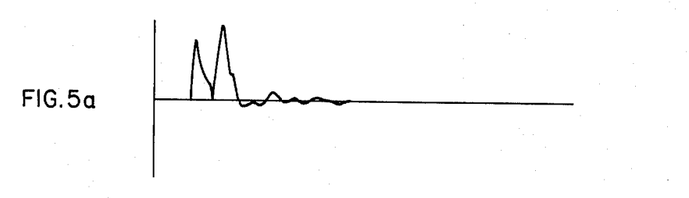
FIGS. 5a–5d, inclusive, are oscillograms of the operation of the basic apparatus of FIG. 4.
Figure 5B:
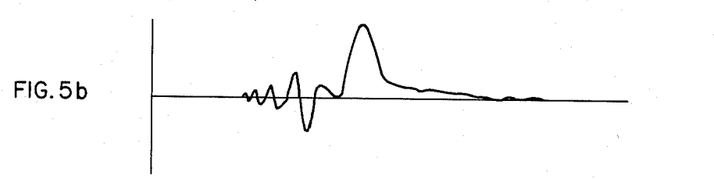
Figure 5C:
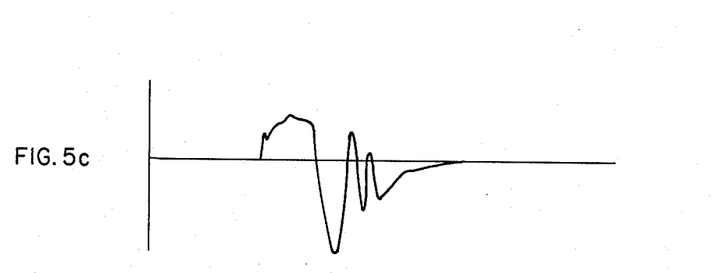
Figure 5D:
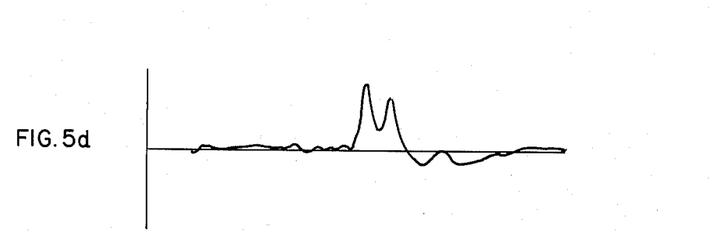

FIGS. 5a–5d, inclusive, represent a series of oscillograms illustrating the operation of the basic apparatus of FIG. 4. FIG. 5a represents a double pulse signal sent over the channel and received as the distorted signal represented by FIG. 5b. It is to be noted that, because of dispersion, the discrimination between the two transmitted pulses has been completely lost at the receiver. FIG. 5c represents the impulse response of the line 10, connected as described, that is, of a line having a response approximating, above a certain squelch level, the function sgn $h(T-t)$. The over-all response of the line 10, connected as described, to the received pulse of FIG. 5b is represented in FIG. 5d which, it is seen, clearly discriminates the two transmitted pulses and represents a very considerable reduction in the distortion of their waveforms when transmitted through the channel and received as the signal represented in FIG. 5b.

Figure 6:
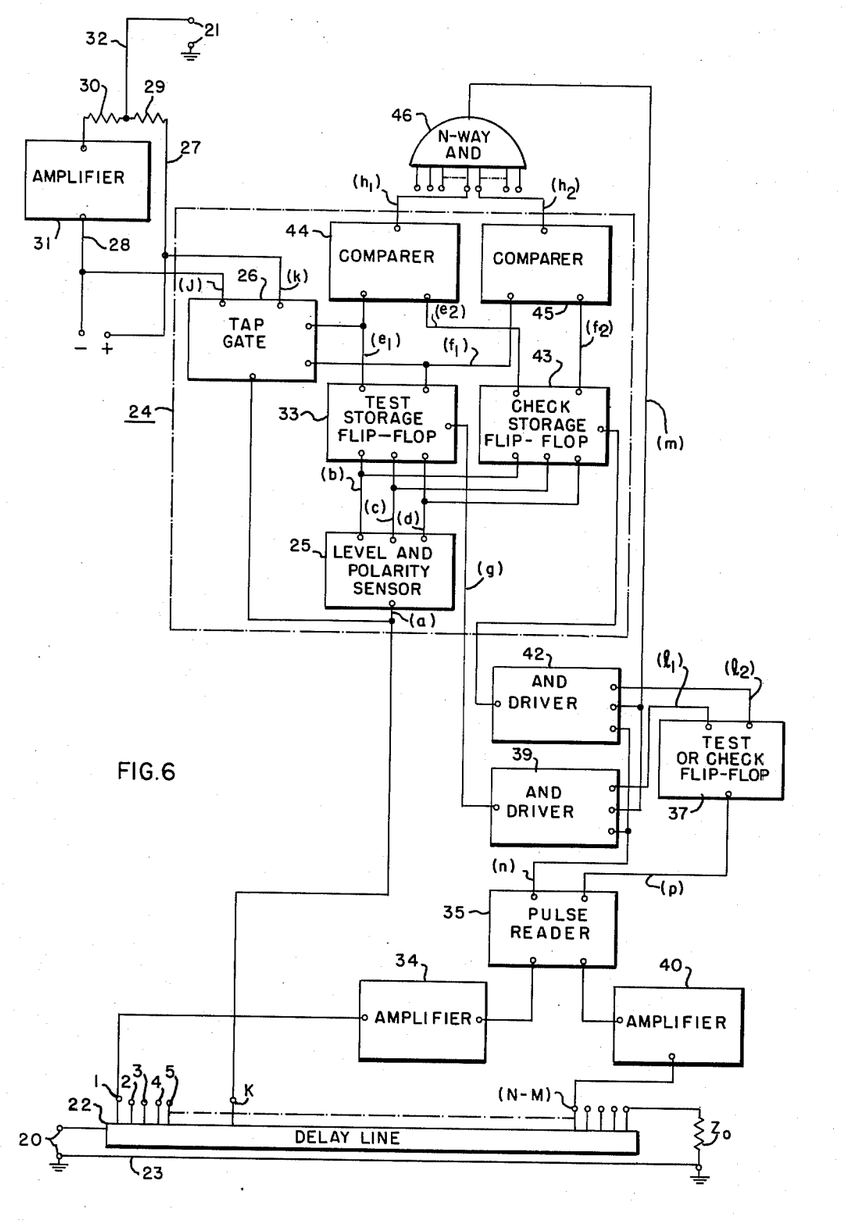
FIG. 6 is a diagram representing a complete system for automatically implementing the basic concept of the invention.

Referring now to FIG. 6 of the drawings, there is represented a complete system for implementing the principles just described. For the sake of continuity and coherency, detailed descriptions of the several units illustrated in block diagrams are deferred and their operations initially will be assumed as described. FIG. 6 represents an apparatus useful in a wave-signal translating channel for minimizing distortion of a transmitted signal, particularly an impulse signal, arising from non-linear phase characteristics of the channel. Specifically, the system includes an input circuit 20 for receiving the distorted signals after transmission through a dispersive or multipath channel, and an output circuit 21. The system includes a wave-signal transmission line or delay line 22 having a ground or neutral line 23 coupled directly to the input terminals 20. The line 22 is suitably terminated in its characteristic impedance $Z_0$ and has a predetermined time delay. The line is provided with a plurality of electrically spaced or distributed connection taps 1, 2, 3, . . . N. Usually these connection taps will be uniformly spaced, as shown.

The system of FIG. 6 further comprises a signal-processing unit 24 connected to each of the taps of the line 22, for the sake of clarity only a single such unit being shown connected to tap K of the line 22. Each of the units 24 includes means, specifically the level and polarity sensor unit 25, for sensing the level and polarity of the instantaneous signal voltage at each of the taps in response to an electrical signal along the line 22.

The system of FIG. 6 further comprises means responsive to the sensing unit 25 for coupling the signal outputs of all of the taps of the line 22 indicating a signal of positive polarity and of a value in excess of $+e$, directly to the output circuit 21 and for coupling the signal outputs of those of the taps of the line 22 indicating a negative signal of a value in excess of $-e$, to the output circuit 21 with reversed polarity. In general, as shown in FIG. 4, the connection to each of the taps of line 22 includes an isolating element, such as a resistor element, and a plurality of two-position or two-state switches individually connected to the taps of the line through the isolating elements, each switch being operative to couple its associated tap to the output circuit 21 directly in one state and with reversed polarity in the other state.

In the schematic representation of FIG. 4, the switches 12 are shown as simple two-position manually operable switches. In the complete automatic system of FIG. 6, these manual switches could theoretically be replaced by mechanical or electromechanical switching devices but, in practice, they will generally be electronic devices such as vacuum tubes, semiconductors, etc., having two conductivity states while, in the complete system of FIG. 6, each of these switches is practically implemented by automatic switching circuits. Specifically, there is included in the unit 24 means responsive to the sensor unit 25 for operating to one state a tap switch or gate 26 connected to the tap K when it indicates a signal $a$ of positive polarity and completing the circuit from the tap K to the positive bus 27 and for operating the unit 26 to its other state when the tap K indicates a signal $a$ of negative polarity and routing this signal through to the negative bus 28. The manner in which the tap gate 26 is controlled in response to the sensor unit 25 involves also selective response to two successive test signals, as described hereinafter. Because of the complexity of the interconnections of the various units of FIG. 6 and the separate showings of the units in succeeding figures, it has been found convenient to use lower case letters $a$, $b$, $c$, etc., to identify input and output terminals of the several units as well as the signals appearing thereat and, where an output terminal of one unit is connected directly to an input terminal of another unit, to use the same reference letter to refer to both of these terminals and the connection therebetween.

The system of FIG. 6 also comprises means for summing the signal outputs of all of the taps indicating one polarity, for example positive, this means comprising the bus 27 including a current-adding resistor 29 serially included in the connection to the output terminal 21. There is further provided means for summing the signal outputs of the taps of opposite polarity which includes the bus 28 and the current-adding resistor 30 and, in this last circuit, there is included means, such as an amplifier 31, for reversing the polarity of the summation signal in this channel. The system includes means for adding the reversed polarity signal output of the amplifier 31 to the summation signal developed by the bus 28, this means comprising a connection 32 to the junction of resistors 29, 30. As described hereinafter, the sensor unit 25 enables the tap gate 26 to complete the circuit to the bus 27 or the bus 28 only when the signal at its associated tap K exceeds a predetermined positive value $+e$ or a predetermined negative value $-e$.

It frequently occurs that spurious noise pulses received at the input circuit 20 are of a character similar to that of the signal pulses but of different waveform, i.e., having different energy-frequency distribution. It is important that the automatic switching system not respond to such spurious pulses. To this end, the system of FIG. 6 further comprises correlation means coupled to the sensing means, that is to the sensor unit 25, for enabling the coupling means, that is the tap gate 26, only upon the occurence of predetermined correlated signal components in the input signal, for example, similar voltage distribution along the line 22 in response to two successive test pulses. This correlation means includes means responsive to the distribution along the line 22 of a first test signal for storing the instantaneous tap-polarity information, specifically a test storage flip-flop unit 33, coupled to the sensor unit 25 and to the tap gate 26, and means responsive to the receipt of the wave front of a test signal at a line tap near the input circuit 20, for example tap No. 1, for enabling the storage flip-flop 33. Specifically, as a first test pulse enters the line 22 and at the first significantly positive response at tap No. 1, the signal at tap No. 1, amplified by unit 34, is applied to a pulse reader 35 and sets that unit to a "zero" state so that it supplies a negative pulse $p$ to a test-or-check flip-flop circuit 37 which switches the unit 37 so that it supplies at its output terminal, a pulse $1_1$ which turns on an AND driver unit 39 which, in turn, supplies a pulse $g$ to each of the test storage flip-flops 33 to register therein a positive or negative signal, depending upon its conditioning by the level sensor unit 25.

The system of FIG. 6 also includes means responsive to the receipt of the wave front of the test pulse signal at a line tap near the end of line 22, specifically the $(N-M)$ tap, where M may be the order of 5, for terminating the storage of the tap-polarity information in the storage flip-flops 33. Specifically, as the test pulse passes down the line 22, each of the tap level sensors 25 is continuously changing the reference voltage information fed to the test storage flip-flops 33. When the first significantly positive signal hits the line tap $(N-M)$, its associated amplifier 40 sets the pulse reader 35 to a "one" state and the pulse reader supplies a negative pulse to the AND driver unit 39 which, in turn, supplies a pulse to the test storage flip-flop 33 so that the instantaneous tap information of the line 22 is fed into each of these storage flip-flops.

The system of FIG. 6 further comprises means responsive to the distribution along the line 22 of a second test pulse signal for comparing the instantaneous tap-polarity information derived therefrom with the corresponding first test pulse tap information stored as just described. Specifically, the second test pulse signal initiates the same sequence of operations as those described with respect to the first test pulse, except that the test-or-check flip-flop unit 37 is switched by such second test pulse signal so that it supplies an enabling pulse $1_2$ to AND driver unit 42 which, in turn, supplies a pulse to check storage flip-flop 43 to store therein the line-tap information derived from the sensor unit 25.

The system of FIG. 6 further comprises means responsive to a predetermined correlation between the line-tap information representative of the first test pulse stored in the units 33 and the line tap information representative of the second test pulse stored in the units 43 for coupling the signal outputs of all of the taps of the line 22 indicating one polarity directly to the output circuit 21 and for coupling the signal outputs of the taps of the line 22 indicating the opposite polarity to the output circuit 21 with reversed polarity. Specifically, the information stored in the units 33 and 43 is applied to each of the comparer units 44 and 45 and, if the information in each test storage unit 33 exactly matches the information in the corresponding check storage unit 43, the units 44 and 45 are coupled to an N-way AND circuit or unit 46, which, when proper correlation exists, develops an output pulse $m$ which inhibits the AND driver units 39 and 42 so that the tap line information is frozen in the test storage units 33 and the tap gates 26 for processing subsequently translated signal pulses. On the other hand, if the tap line information stored in the units 33 and 43 does not show proper correlation, the N-way AND circuit 46 is not enabled and the procedure just described will continue until such correlation is shown.

The system of FIG. 6 further comprises means responsive to the sensor unit 25 for enabling the coupling means or tap gate 26 only with respect to those taps of the line 22 at which the signal voltage exceeds a predetermined value. This operation is effected by virtue of the fact that the tap gate 26 supplies no output to either the positive bus 27 or the negative bus 28 when the signal input from the line tap K is less than a predetermined positive or negative value, as described hereinafter.

Coming now to the several units shown in FIG. 6 in block form, these are represented in FIGS. 7–12, inclusive. In general, these units embody conventional computer logic based on the binary system, including devices exhibiting one state to represent the binary number 0 and a second state to represent the binary number 1. Of these units, certain are conventional and need not be shown in detail. For example, the pulse reader 35 may be a conventional bistable flip-flop that is switched by positive pulses from either of the amplifiers 34, 40 upon the occurrence of a signal of significant wave front at the terminal 1 or terminal $(N-M)$, respectively. Similarly, the test-or-check flip-flop 37 may be a conventional bistable flip-flop which switches states whenever a positive input pulse is applied thereto from the pulse reader unit 35.

Figure 7:
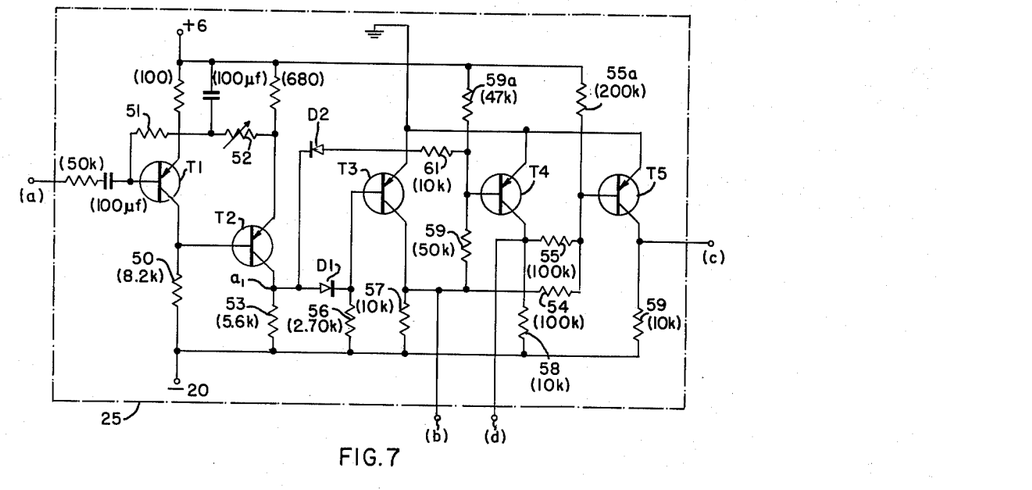
FIG. 7 is a diagram of a level and polarity sensor circuit for use in the apparatus of FIG. 6.
Figure 8:
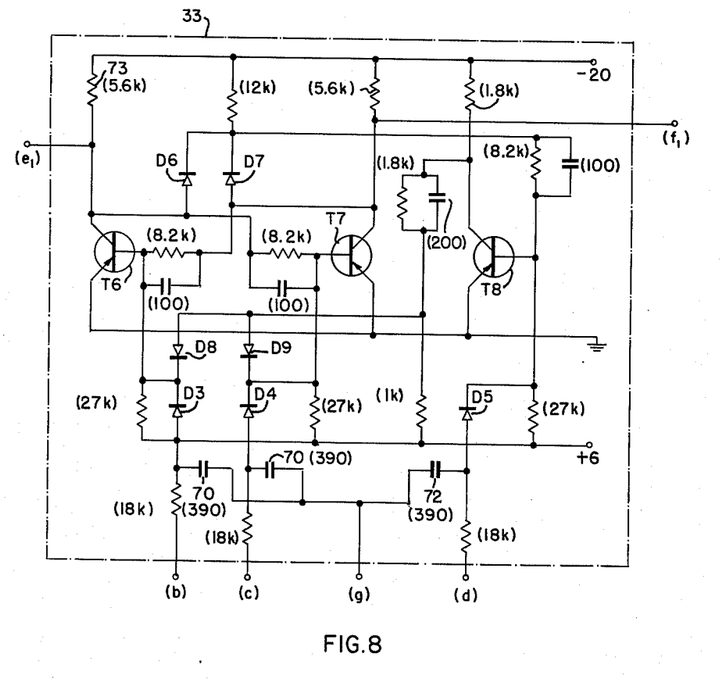
FIG. 8 is a diagram of a storage flip-flop circuit suitable for use in the apparatus of FIG. 6.

In FIGS. 7–12, inclusive, the various active circuit elements are shown as semiconductors, specifically transistors and diodes, and supply circuits of particular voltage levels are indicated for ease of explanation and by way of illustration. However, it is understood that the circuits of the invention may be implemented equally well by the use of vacuum tubes and other signal translators and at other voltage levels. For ease of following the interconnections between the several units, the signal inputs and outputs of each of the units are identified by the same reference numerals as in FIG. 6. Furthermore, the circuit values of the several elements of FIGS. 7 and 8 are shown on the drawings for the sake of completeness.

Referring now to FIG. 7 of the drawings, there is represented a level and polarity sensor unit suitable for use as the unit 25 of FIG. 6. This unit comprises a two-stage amplifier including transistors T1 and T2 and three interrelated signal polarity-inverting stages including transistors T3, T4, and T5. The input signal $a$ from the tap K of the line 22 is applied to the base of transistor T1 which has a collector load resistor 50 coupled to the base of transistor T2. There is also a direct-current feedback path from the emitter of transistor T2 to the base of transistor T1 including a resistor 51 in series with an adjustable resistor 52 for controlling the regeneration and gain of the amplifier. The potential $a_1$ across resistor 53 is applied to the base of transistor T3 through the diode D1 and to the base of transistor T4 through the oppositely poled diode D2. The base of transistor T5 is coupled to the collector load resistors 57 and 58 of transistors T3 and T4 through resistors 54 and 55, while the output signal $c$ is taken from a collector load resistor 59 of transistor T5. Transistor T1 may be type 2N508, transistors T2–T5, inclusive, may be type 2N404, and diodes D1 and D2 may be type 1N198.

In the operation of the sensor circuit of FIG. 7, in the quiescent state the output signal $a_1$ of transistor T2 is set to a value of $-1$ volt by means of the adjustable resistor 52. In this state, which may be called the "zero" state, transistor T3 is conductive due to the return of its base to $-20$ volts through a bias resistor 56, so that the signal $b$ taken from the load resistor 57 of transistor T3 is at ground or zero volts. The base potential of transistor T4 is positive due to the voltage-divider network comprising resistors 59 and 59a and the signal level at $b$, which is zero. This condition results in cutoff of transistor T4 so that the voltage at the collector of transistor T4, namely point $d$, is $-18$ volts. Transistor T5 is conductive due to its negative base voltage derived from resistor combination 54, 55, and 55a to points $b$, $d$, and $+6$ volts, respectively. Conduction of transistor T5 results in a signal at point $c$ of zero volts. If, now, the signal $a$ increases so that the signal $a_1$ rises to a value above ground, the diode D1 is forward biased so that the base potential of transistor T3 rises to make this device nonconductive, at the same time returning the signal $b$ to a potential of $-16$ volts, as determined by the voltage-divider including resistors 57, 59, and 59a. The potential $b$ applied to the base of transistor T4 through resistor 59 renders this transistor conductive and, at the same time, renders conductive the transistor T5 by virtue of the connection from terminal $b$ to its base through the resistor 54. Hence, the signal $c$ remains clamped essentially at ground potential by transistor T5.

If, now, the signal $a$ drops to a value such that the signal output $a_1$ of transistor T2 falls to a negative potential in excess of $-2$ volts, the forward bias on diode D1 is removed, the potential of the base of transistor T3 falls and renders it conductive, while transistor T4 is rendered conductive by virtue of the back bias of diode D2 by the negative potential $a_1$. Under these circumstances, transistor T5 is rendered nonconductive by the removal of the negative bias from its base and the signals $b$ and $d$ are at ground or zero volts while the signal $c$ is at $-20$ volts. In brief, transistor T5 is rendered conductive if either transistor T3 or T4 is nonconductive but is rendered nonconductive if both transistors T3 and T4 are conductive.

The resistor 52 may be adjusted so that, for values of input signal $a$ which develop output signals $a_1$ within the range of $-2$ volts to zero volts, transistors T2, T4 and T5 remain in the defined "zero" state. If the gain of the amplifier stages including transistors T1 and T2, which is dependent upon the adjustment of the resistor 52, is 100, then the level of the signal $a$ which maintains this zero state will be $\pm 10$ millivolts. This corresponds to the squelch levels $+e$ and $-e$ of FIG. 4 and represents the conditions for which a given tap of the line 22 is interconnected to either of the buses 27, 28.

In FIG. 8 there is represented a circuit suitable for embodiment in the test storage flip-flop unit 33 of FIG. 6 to which the check storage flip-flop unit 43 is identical. This unit is capable of three possible stable states, of which each state identifies the signal potential at a given tap K. This unit includes four input circuits to which the reference potentials $b$, $c$, and $d$ are applied from the sensor unit 25 just described and the potential $g$ from the AND driver unit 39, described hereinafter. This unit includes three repeater stages including transistors T6, T7, and T8 which are so interconnected that if any one transistor is conductive, it holds the other two transistors nonconductive. The input pulse $g$ is derived from the AND driver unit 39 during the first test pulse signal and is applied through differentiating condensers 70, 71, and 72 and diodes D3, D4, and D5 to the base electrodes of the transistors T6, T7, and T8, respectively, to which are also applied the signals $b$, $c$, and $d$, respectively. Transistors T6, T7, and T8 may be type 2N404 and diodes D3 to D9, inclusive, may be type 1N198.

Specifically, if transistor T6 is rendered conductive by an appropriate bias from the signal $b$ and a differentiated pulse from the signal $g$, the signal $e_1$ across the load resistor 73 of transistor T6 is clamped at substantially zero or ground potential while the bases of transistors T7 and T8 are driven positive with respect to ground, the latter through the diode D6, thereby rendering these transistors nonconductive. The signal $f_1$ is clamped at —6 volts. In a similar manner, if transistor T7 is rendered conductive, transistors T6 and T8 are rendered nonconductive and signal $f_1$ is clamped at ground or zero volts while signal $e_1$ returns to —6 volts. If transistor T8 is rendered conductive, its collector falls to ground potential so that the diodes D6 and D7, connected to the bases of transistors T6 and T7 respectively, are forward biased, rendering these transistors nonconductive. In this state, both signals $e_1$ and $f_1$ have a value of —6 volts.

The transistors T6, T7, and T8 are selectively rendered conductive by the signals $b$, $c$, and $d$, despectively. If the signal $b$ is —16 volts, the differentiated input pulse $g$ will be insufficient to render transistor T6 conductive. In the same manner, the reference voltages $c$ and $d$ render the transistors T7 and T8, respectively, nonconductive. As previously described in connection with the sensor unit 25, at any instant that two of the signals $b$, $c$, and $d$ are at zero volts and the third is negative, a positive pulse, signal $g$ will be developed and cut off two of the transistors T6, T7, and T8. Two of the transistors, being nonconductive, will, as described above, render the third transistor conductive which thereupon holds the other two transistors nonconductive.

Figure 9:
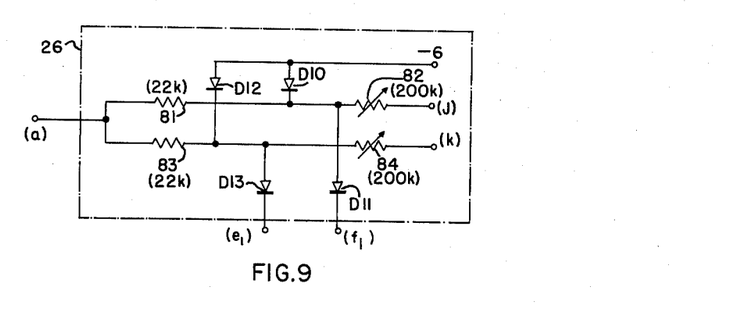
FIG. 9 is a diagram of a switching circuit or tap gate suitable for use in the apparatus of FIG. 6.

In FIG. 9, there is represented the diagram of a switching circuit suitable for used as the tap gate unit 26 of FIG. 6 through which each tap of the line 22 feeds a signal to the positive bus 27 or the negative bus 28, depending upon the polarity of the signal at that tap. The circuit of FIG. 9 comprises a pair of simple resistor diode gates selectively enabled by the pulses $e_1$ and $f_1$ from the test storage flip-flop 33 and the check storage flip-flop 43. The input signal $a$ from the tap K of the delay line is connected to terminals $j$ and $k$ through a pair of channels, the first comprising series-connected resistors 81 and 82 connected to output terminal $j$ and the second comprising series-connected resistors 83 and 84 connected to the terminal $k$. The junction of resistor 81 and 82 is adapted selectively to be clamped to —6 volts through diodes D10 and D11 serially connected between the terminal —6 and the terminal $f_1$. Similarly, the junction of resistors 83 and 84 is adapted to be clamped to —6 volts by means of the diodes D12 and D13 serially connected between the terminal —6 and the terminal $e_1$. The values of the resistors 81, 82, 83 and 84 are selected so that terminals $j$ and $k$ quiescently are —3 volts.

If the signal $e_1$ is negative relative to ground the junction of resistors 83 and 84 is clamped to —6 volts with the result that no signal can pass from terminal $a$ to terminal $k$. On the other hand, if the signal at terminal $e_1$ is at ground potential, both diodes D12 and D13 are back-biased to be nonconductive so that signals pass freely from terminal $a$ to terminal $k$. In a similar fashion, signals from terminal $a$ to terminal $j$ are impeded or allowed to pass, depending upon whether the signal voltage at terminal $f_1$ is at ground or at —6 volts.

In brief, signals from the tap K of line 22 are permitted to pass via terminal $j$ to the negative bus 28 or via terminal $k$ to the positive bus 27, depending upon the polarity of the signals $e_1$ and $f_1$ as determined by sensor unit 25 and the test storage flip-flop 33.

Figure 10:
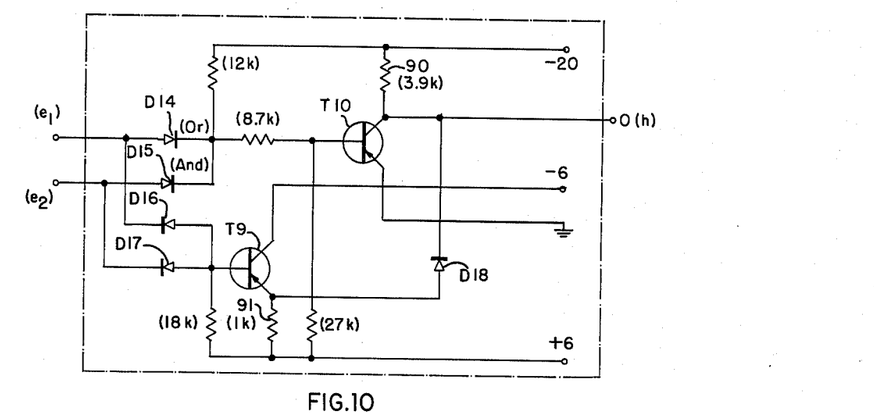
FIG. 10 is a diagram of a comparing circuit suitable for use in the apparatus of FIG. 6.

In FIG. 10 is represented a diagram of a comparing circuit suitable for use as the comparer units 44 and 45 of FIG. 6. Each comparer unit tests the outputs $e_1$ and $e_2$ of the check and test storage flip-flops or the outputs $f_1$ and $f_2$ of these units. The terminals $e_1$ and $e_2$ are connected through a pair of "OR" diodes D14 and D15 to the base of a transistor T10 having a load resistor 90 connected to the output terminal $h$. The terminals $e_1$ and $e_2$ are also connected through a pair of reversely connected "AND" diodes D16 and D17 to the base of an emitter-follower transistor T9 having an emitter-load resistor 91 coupled through a diode D18 to the output terminal $h$.

If the output $e_1$ of the test storage unit 33 and the output $e_2$ of the check storage unit 43 are both at —6 volts, the base of transistor T10 is also at —6 volts and it is made conductive, clamping the terminal $h$ to ground. If both of the signals $e_1$ and $e_2$ are at ground, the base of transistor T10 is likewise at ground and it is rendered nonconductive. However, under these circumstances, the diodes D16 and D17 impose ground potential on the base of transistor T9, that transistor becomes conductive, and the potential across emitter resistor 91 biases the diode D18 so that it establishes the potential at terminal $h$ at ground.

On the other hand, if the signals $e_1$ and $e_2$ are not alike, for example —6 volts and ground or ground and —6 volts, respectively, the potential applied to the base of transistor T10 is grounded potential and this transistor is made nonconductive. At the same time, a —6 volts is applied through the AND diodes D16 and D17 to the base of transistor T9 so that the output of this emitter-follower is —6 volts which is impressed upon terminal $h$ through the diode D18 so that the signal at terminal $h$ is also —6 volts.

In brief then, if the signals $e_1$ and $e_2$ from the test storage unit 33 and the check storage unit 43 correspond, the signal at terminal $h$ is at ground potential while, if they do not correspond, the signal at terminal $h$ is —6 volts. As described hereinafter, the N-way AND unit 46 responds to a dissimilarity in the signals from any of the taps of the line 22 corresponding to successive test signals and, when there is no dissimilarity, initiates appropriate control.

Figure 11:
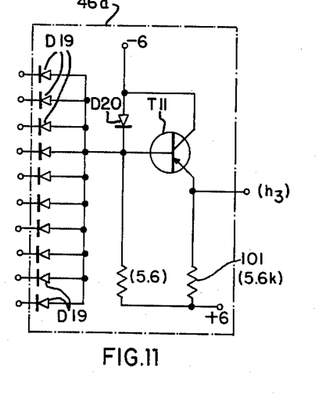
FIG. 11 is a 10-way AND circuit.

The circuitry of the N-way AND unit 46 of FIG. 6 will depend upon the number of taps on the line 22. In one practical design, the line 22 is provided with 40 taps and the 80-way AND circuit is realized by 8 10-way AND circuits feeding an 8-way NAND circuit, that is, an AND circuit having an inverted output. A circuit suitable for use as the 10-way AND circuit is shown in FIG. 11. The signals $h_1$ from the several comparer units 44 are individually fed through a series of parallel connected diodes D19 to the base of an emitter-follower transistor T11 having an emitter load 101 connected to an output terminal $h_3$. A diode D20 is connected between the input terminal —6 and the base of transistor T11. A similar group of AND circuits is fed with the signal outputs $h_2$ from the comparer 46 to develop an additional group of $h_3$ signals. The signals $h_3$ from the several AND circuits of FIG. 11 are applied to an 8-way NAND circuit, shown in FIG. 12, comprising a series of parallel connected diodes D21 connected to the base of transistor T12 having a load resistor 110 connected to input terminal —20 and shunted by a diode D22 between the terminal —6 and the transistor collector.

Figure 12:
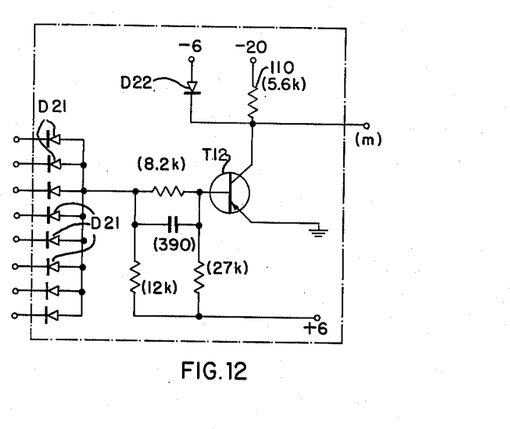
FIG. 12 is an 8-way NAND circuit which, together, are suitable for use as the 80-way AND circuit of FIG. 6.

Considering the operation of the circuits of FIGS. 11 and 12, if all of the signals $h_1$ and $h_2$ fed from the several comparer units 44 and 46 are at ground, the diode D20 is disabled and the emitter-follower transistor T11 repeats the ground potential at terminal $h_3$. With ground potentials $h_3$ applied to each of the input circuits of the NAND unit of FIG. 12, the transistor T12 is rendered nonconductive and the output terminal $m$ is clamped at —6 volts by the diode D22. This indicates a correspondence between the signals stored in the test storage flip-flop and those stored in the check storage flip-flop, that is, between the stored distribution of the first and second test signals along the line 22, indicating that neither stored signal represents a random noise pulse. The signal $m$ at —6 volts disables the AND driver units 39 and 42 and freezes the connections of the tap gate units 26.

However, if any of the signals $h_1$ and $h_2$ from the comparer units 44 and 46 is at —6 volts, then the diode D20 is enabled and the base of the transistor T11 is at —6 volts, and this is repeated at the emitter terminal $h_3$. If any of the signals applied to the terminals $h_3$ of FIG. 12 is —6 volts, indicating a lack of correlation between the two stored signals, the transistor T12 becomes conductive and establishes a ground potential at the output terminal m, enabling the AND driver units 39 and 42 so that the system will continue to compare succeeding pulses impressed on line 22 until a correlation is realized, representing the storage of successive test pulses in the test and check storage flip-flops.

The AND driver units 39 and 42 of FIG. 6 may be conventional AND circuits, such as that shown in FIG. 11, with three inputs but are preferably followed by a conventional amplifier as in the AND circuit of FIG. 11. If all of the input signals to the AND driver, for example the unit 39, are at ground potential, its output g is at ground potential and no pulses are supplied to trigger the test or check storage flip-flops. If any of its input signals is at −6 volts, the transistor of the AND circuit is turned on and the driving amplifier is cut off so that the output g of the unit goes to −6 volts and pulses are supplied to trigger the test and check storage flip-flops so that they continue to compare the signal distribution along the line 22 for succeeding input pulses.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In a wave-signal translation channel, an apparatus for minimizing distortion of a translated signal arising from nonlinear phase characteristics of the channel comprising:
   (a) an input circuit for supplying a signal to be translated;
   (b) an output circuit;
   (c) a wave-signal transmission line coupled to said input circuit, having a predetermined time delay, and provided with a plurality of electrically spaced connection taps;
   (d) means for sensing the polarity and magnitude of the instantaneous signal voltage at each of said taps in response to the distribution of an electrical test signal along said line;
   (e) means for coupling the signal outputs of all of said taps indicating one polarity directly to said output circuit and for coupling the signal outputs of the remaining of said taps to said output circuit with polarities reversed with respect to their polarities at their respective taps;
   (f) and means for enabling said coupling means only with respect to those taps at which said test-signal voltage exceeds a predetermined value.

2. In a wave-signal translating channel, an apparatus for minimizing distortion of a translated pulse signal arising from nonlinear phase characteristics of the channel comprising:
   (a) an input circuit for supplyinga pulse signal to be translated;
   (b) an output circuit;
   (c) a wave-signal transmission line coupled to said input circuit, having a predetermined time delay, and provided with a plurality of connection taps;
   (d) means for sensing the polarity and magnitude of the instantaneous signal voltage at each of said taps in response to the distribution of an electrical test signal along said line;
   (e) means for coupling the signal outputs of all of said taps indicating one polarity directly to said output circuit and for coupling the signal outputs of the remaining of said taps to said output circuit with polarities reversed with respect to their polarities at their respective taps;
   (f) and means for enabling said coupling means only with respect to those taps at which said signal voltage exceeds a predetermined value.

3. In a wave-signal translating channel, an apparatus for minimizing distortion of a translated signal arising from nonlinear phase characteristics of the channel comprising:
   (a) an input circuit for supplying a signal to be translated;
   (b) an output circuit;
   (c) a wave-signal transmission line coupled to said input circuit, having a predetermined time delay, and provided with a plurality of electrically uniformly distributed connection taps;
   (d) means for sensing the polarity and magnitude of the instantaneous signal voltage at each of said taps in response to the distribution of an electrical test signal along said line;
   (e) means for coupling the signal outputs of all of said taps indicating one polarity directly to said output circuit and for coupling the signal outputs of the remaining of said taps to said output circuit with polarities reversed with respect to their polarities at their respective taps;
   (f) and means for enabling said coupling means only with respect to those taps at which said test-signal voltage exceeds a predetermined value.

4. In a wave-signal translating channel, an apparatus for minimizing distortion of a translated signal arising from nonlinear phase characteristics of the channel comprising:
   (a) an input circuit for supplyinga signal to be translated;
   (b) an output circuit;
   (c) a wave-signal transmission line coupled to said input circuit, having a predetermined time delay, and provided with a plurality of electrically spaced connection taps;
   (d) means for sensing the polarity and magnitude of the instantaneous signal voltage at each of said taps in response to the distribution of an electrical test signal along said line;
   (e) means responsive to said sensing means for coupling the signal outputs of all of said taps indicating one polarity directly to said output circuit and for coupling the signal outputs of the remaining of said taps to said output circuit with polarities reversed with respect to their polarities at their respective taps;
   (f) and means responsive to said sensing means for enabling said coupling means only with respect to those taps at which said test-signal voltage exceeds a predetermined value.

5. In a wave-signal translating channel, an apparatus for minimizing distortion of a translated signal rising from nonlinear phase charcteristics of the channel comprising:
   (a) an input circuit for supplying a signal to be translated;
   (b) an output circuit;
   (c) a wave-signal transmission line coupled to said input circuit, terminated in its characteristic impedance, having a predetermined time delay, and provided with a plurality of connection taps;
   (d) means for sensing the polarity of the instantaneous signal voltage at each of said taps in response to the distribtuion of an electrical test signal along said line;
   (e) a plurality of current-limiting impedance elements;
   (f) a plurality of two-state switches individually connected to said taps through said impedance elements, each switch being operative to couple its associated tap to said output circuit directly in one state and with reversed polarity in the other state;
   (g) means responsive to said sensing means for operating to one state switches associated with taps indicating one signal polarity and for operating to the other state switches associated with taps indicating the opposite signal polarity;

(h) and means for enabling said operating means only with respect to those taps at which said signal voltage exceeds a predetermined value.

6. In a wave-signal translating channel, an apparatus for minimizing distortion of a translated signal arising from nonlinear phase characteristics of the channel comprising:

(a) an input circuit for supplying a signal to be translated;

(b) an output circuit;

(c) a wave-signal transmission line coupled to said input circuit, having a predetermined time delay, and provided with a plurality of connection taps;

(d) means for sensing the polarity of the instantaneous signal voltage at each of said taps in response to the distribution of an electrical test signal along said line;

(e) means for summing the signal outputs of all of said taps indicating one polarity;

(f) means for summing the signal outputs of the remaining of said taps;

(g) means for reversing the polarity of one of said summation signals;

(h) means for adding the reversed-polarity signal and the other of said summation signals;

(i) and means for enabling both said summing means only with respect to those taps at which said test-signal voltage exceeds a predetermined value.

7. In a wave-signal translating channel, an apparatus for minimizing distortion of a translated signal arising from nonlinear phase characteristics of the channel comprising:

(a) an input circuit for supplying a pair of successive test signals;

(b) an output circuit;

(c) a wave-signal transmission line coupled to said input circuit, having a predetermined time delay, and provided with a plurality of electrically spaced connection taps;

(d) means for sensing the instantaneous signal voltage at each of said taps in response to the distribution of an electrical test signal along said line;

(e) linear means for simultaneously coupling the signal outputs of all of said taps indicating one polarity directly to said output circuit and for coupling the signal outputs of the remaining of said taps to said output circuit with polarities reversed with respect to their polarities at their respective taps;

(f) and correlation means coupled to said sensing means for enabling said coupling means only upon the occurrence of predetermined correlated test-signal components in successive test input signals.

8. In a wave-signal translating channel, an apparatus for minimizing distortion of a translated signal arising from nonlinear phase characteristics of the channel comprising:

(a) an input circuit for supplying a pair of successive test signals;

(b) an output circuit;

(c) a wave-signal transmission line coupled to said input circuit, having a predetermined time delay, and provided with a plurality of electrically uniformly spaced connection taps;

(d) means for sensing the instantaneous signal voltage at each of said taps in response to the distribution of an electrical test signal along said line;

(e) linear means responsive to said sensing means for simultaneously coupling the signal outputs of all of said taps indicating one polarity directly to said output circuit and for coupling the signal outputs of the remaining of said taps to said output circuit with polarities reversed with respect to their polarities at their respective taps;

(f) and correlation means coupled to said sensing means for enabling said coupling means only upon the occurrence of predetermined correlated test-signal components in successive test input signals.

9. In a wave-signal translating channel, an apparatus for minimizing distortion of a translated signal arising from nonlinear phase characteristics of the channel comprising:

(a) an input circuit for supplying a pair of successive test signals;

(b) an output circuit;

(c) a wave-signal transmission line coupled to said input circuit, having a predetermined time delay, and provided with a plurality of uniformly distributed connection taps;

(d) means for sensing the polarity of the instantaneous signal voltage at each of said taps in response to the distribution of an electrical signal along said line;

(e) means responsive to the distribution along said line of a first test signal for storing the instantaneous tap-polarity information;

(f) means responsive to the distribution along said line of a succeeding test signal for comparing the instantaneous tap-polarity information with the corresponding stored information;

(g) and means responsive to a correleation between said two sets of information for coupling the signal outputs of all of said taps indicating one polarity directly to said output circuit and for coupling the signal outputs of the remaining of said taps to said output circuit with reversed polarity.

10. In a wave-signal translating channel, an apparatus for minimizing distortion of a translated signal arising from nonlinear phase characteristics of the channel comprising:

(a) an input circuit for supplying a pair of successive test signals;

(b) an output circuit;

(c) a wave-signal transmission line coupled to said input circuit, having a predetermined time delay, and provided with a plurality of connection taps;

(d) means for sensing the level and polarity of the instantaneous signal voltage at each of said taps in response to the distribution of an electrical signal along said line;

(e) means responsive to the distribution along said line of a first test signal for storing the instantaneous tap-polarity information;

(f) means responsive to the receipt of the wave front of said first test signal at a line tap near said input circuit for enabling said signal distribution responsive means;

(g) means responsive to the receipt of said wave front at a line tap near the end thereof for terminating the storage of said tap-polarity information;

(h) means responsive to the distribution along said line of a succeeding test signal for comparing the instantaneous tap-polarity information with the corresponding stored information;

(i) and means responsive to a correlation between said two sets of information for coupling the signal outputs of all of said taps indicating one polarity directly to said output circuit and for coupling the signal outputs of the remaining of said taps to said output circuit with reversed polarity.

11. In a wave-signal translating channel, an apparatus for minimizing distortion of a translated signal arising from nonlinear phase characteristics of the channel comprising:

(a) an input circuit for supplying a pair of successive test signals;

(b) an output circuit;

(c) a wave-signal transmission line coupled to said input circuit, having a predetermined time delay, and provided with a plurality of connection taps;

(d) means for sensing the polarity of the instantaneous signal voltage at each of said taps in response to the distribution of an electrical signal along said line;

(e) means responsive to the distribution along said line of a first test signal for storing the instantaneous tap-polarity information;

(f) means responsive to the distribution along said line of a succeeding test signal for comparing the instantaneous tap-polarity information with the corresponding stored information;

(g) means responsive to a correlation between said two sets of information for coupling the signal outputs of all of said taps indicating one polarity directly to said output circuit and for coupling the signal outputs of the remaining of said taps to said output circuit with reversed polarity;

(h) and means responsive to said sensing means for enabling said correlation responsive means only with respect to those taps at which said signal voltage exceeds a predetermined value.

References Cited by the Examiner

UNITED STATES PATENTS

| | | | |
|---|---|---|---|
| 2,273,163 | 2/42 | Wilson | 328—67 X |
| 2,942,195 | 6/60 | Dean | 328—138 |
| 2,985,834 | 5/61 | Treadwell | 328—151 X |
| 3,114,884 | 12/63 | Jakowatz | 328—165 X |

ARTHUR GAUSS, *Primary Examiner.*

JOHN W. HUCKERT, *Examiner.*